US008818461B2

(12) United States Patent
Cybart et al.

(10) Patent No.: US 8,818,461 B2
(45) Date of Patent: Aug. 26, 2014

(54) HEADSET WITH A PIVOTING MICROPHONE ARM AND SPEAKER

(75) Inventors: Adam Cybart, McHenry, IL (US); Won Chung, Chicago, IL (US); Chris Hougton, Chicago, IL (US); Ryan Rye, Duluth, GA (US); Dickon Isaacs, Chicago, IL (US); Dan Clements, Chicago, IL (US)

(73) Assignee: Motorola Mobility LLC, Liberyville, IL (US)

( * ) Notice: Subject to any disclaimer, the term of this patent is extended or adjusted under 35 U.S.C. 154(b) by 635 days.

(21) Appl. No.: 12/872,568

(22) Filed: Aug. 31, 2010

(65) Prior Publication Data
US 2012/0052924 A1   Mar. 1, 2012

(51) Int. Cl.
*H04M 1/00* (2006.01)
(52) U.S. Cl.
USPC ...................................................... 455/569.1
(58) Field of Classification Search
None
See application file for complete search history.

(56) References Cited

U.S. PATENT DOCUMENTS

| | | | |
|---|---|---|---|
| 3,971,900 A * | 7/1976 | Foley | 379/430 |
| 5,761,298 A | 6/1998 | Davis et al. | |
| 6,230,029 B1 | 5/2001 | Hahn et al. | |
| 6,236,969 B1 * | 5/2001 | Ruppert et al. | 704/275 |
| 7,190,797 B1 * | 3/2007 | Johnston et al. | 381/74 |
| 7,391,862 B2 | 6/2008 | Rath et al. | |
| 2004/0052364 A1 * | 3/2004 | Bodley et al. | 379/430 |
| 2005/0259812 A1 | 11/2005 | Chen | |
| 2007/0003098 A1 * | 1/2007 | Martenson et al. | 381/388 |
| 2008/0044002 A1 * | 2/2008 | Bevirt et al. | 379/430 |
| 2008/0132292 A1 * | 6/2008 | Hansen et al. | 455/569.1 |
| 2009/0010461 A1 * | 1/2009 | Klinghult et al. | 381/309 |
| 2009/0174361 A1 * | 7/2009 | Duron et al. | 320/101 |
| 2009/0175480 A1 | 7/2009 | Zhou | |

FOREIGN PATENT DOCUMENTS

| | | |
|---|---|---|
| WO | 0007176 | 2/2000 |
| WO | 0186923 A1 | 11/2001 |
| WO | 2006129290 A1 | 12/2006 |

OTHER PUBLICATIONS

Patent Cooperation Treaty, International Search Report and Written Opinion of the International Searching Authority for International Application No. PCT/US2011/046348, Oct. 14, 2011, 12 pages.

* cited by examiner

*Primary Examiner* — Yuwen Pan
*Assistant Examiner* — Ayodeji Ayotunde

(57) ABSTRACT

A compact lightweight communication device 100 comprising a wireless headset 102 or wireless earset 104 can be provided for wireless communication, to a mobile phone or other wireless electronic communication device 106. The user friendly communication device 100 can have a pivotable boom 146 providing an arm with one and preferably multiple microphones 166 and 168, as well as one or mobile tactile buttons 156. The multifunction communication device can have acoustic audio transducer 134, such as a speaker 136 and/or an earbud 138 or earphone 140. The audio transducer can pivot on a pivot tube 142 comprising a pivotable stem to accommodate the left ear or right ear of the user. The boom and stem can pivot clockwise and/or counterclockwise, manually and independently or can be coupled to automatically pivot together.

17 Claims, 15 Drawing Sheets

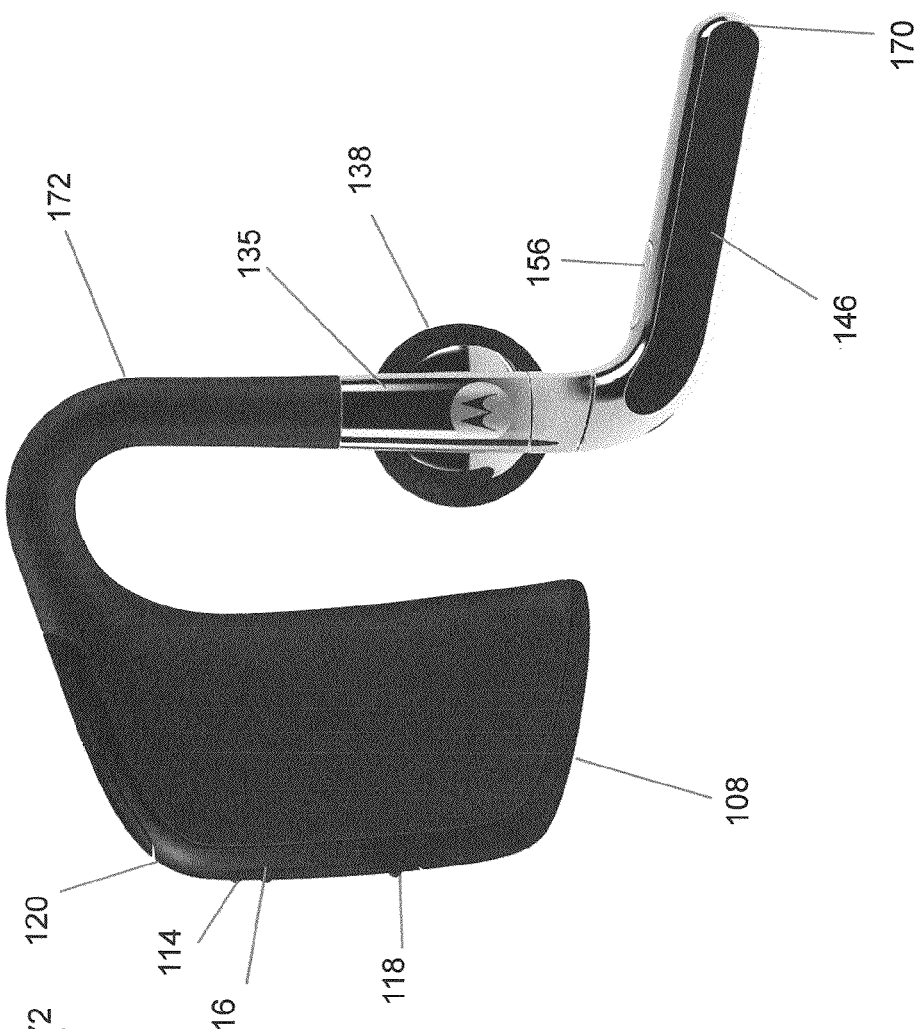
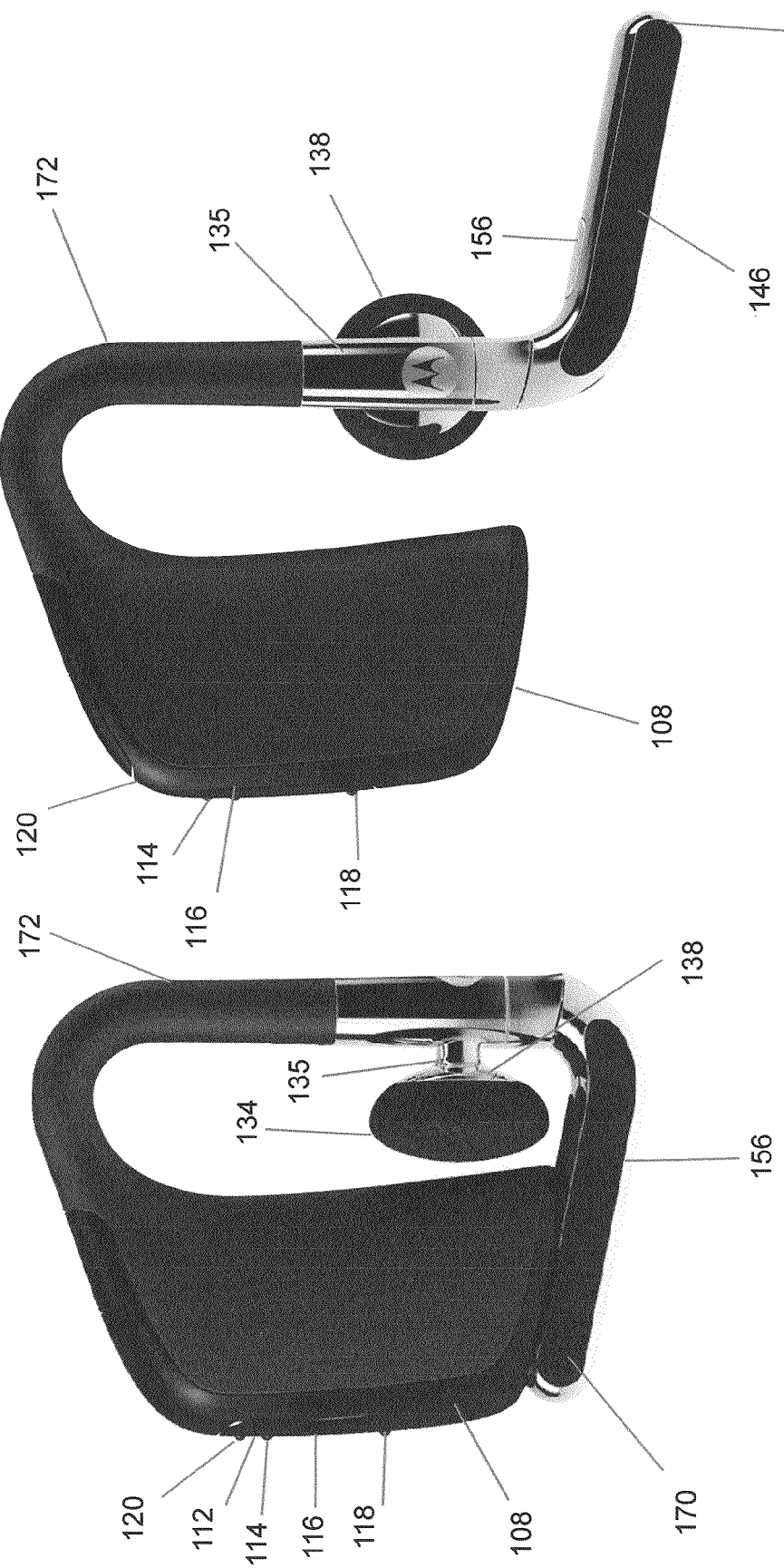

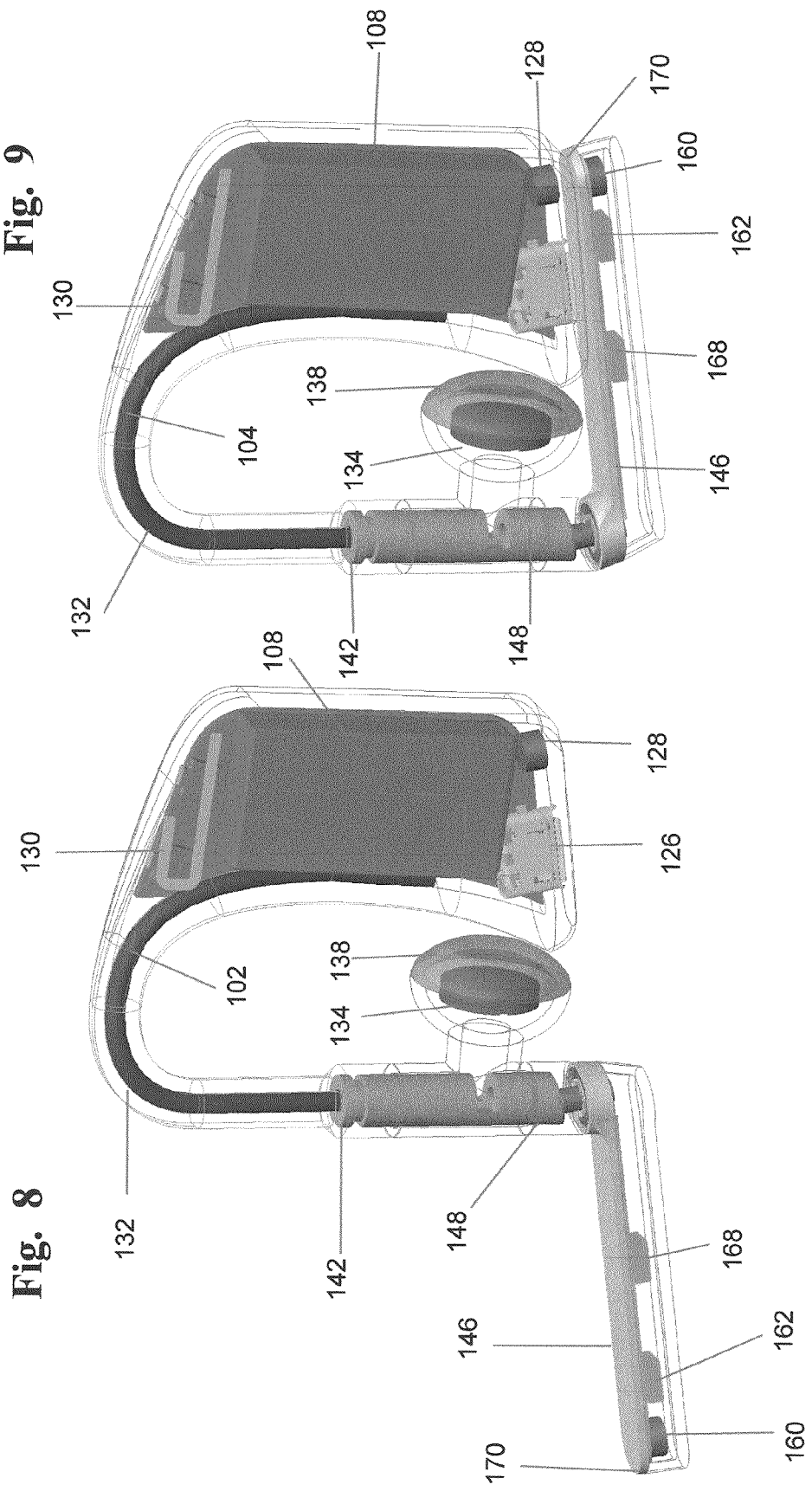

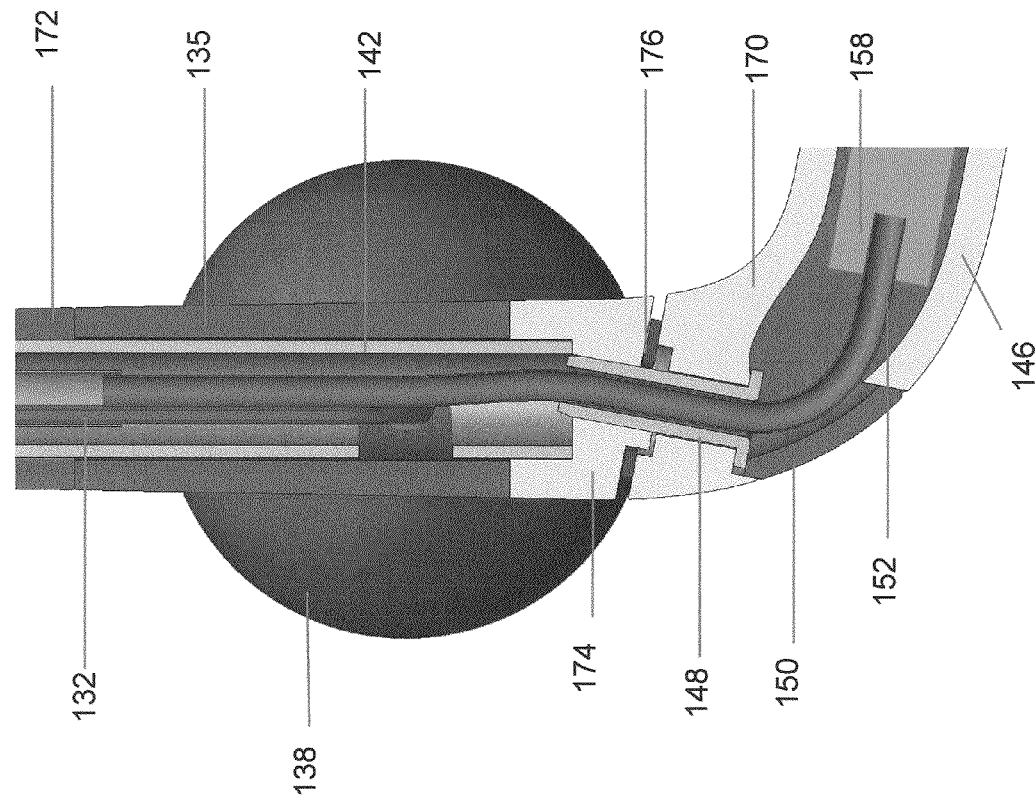
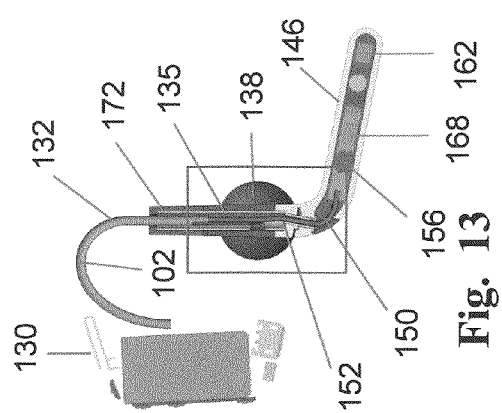

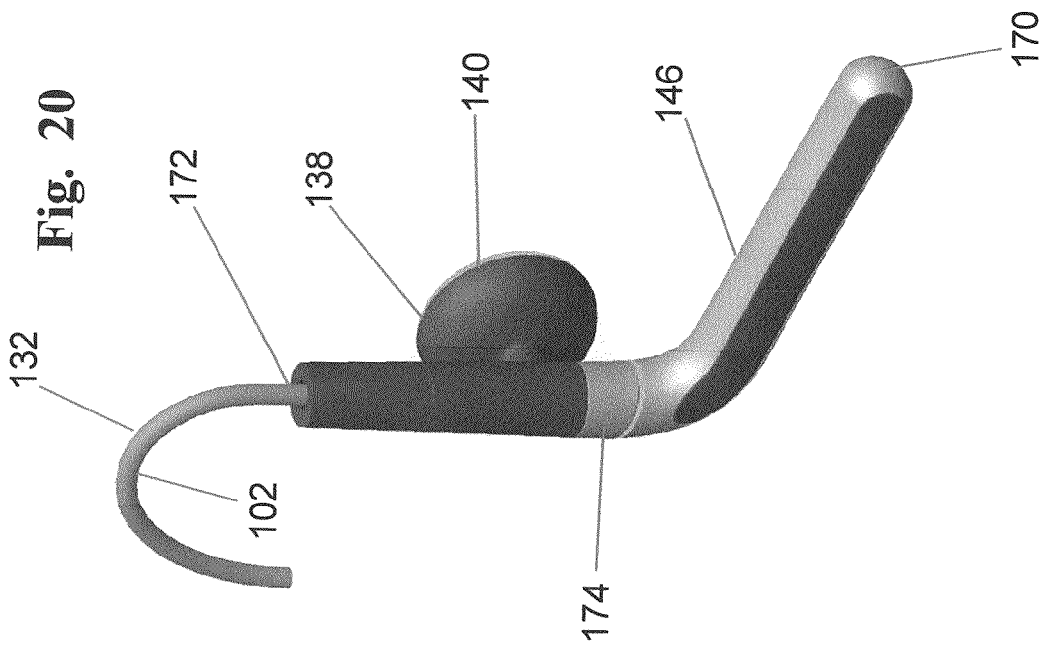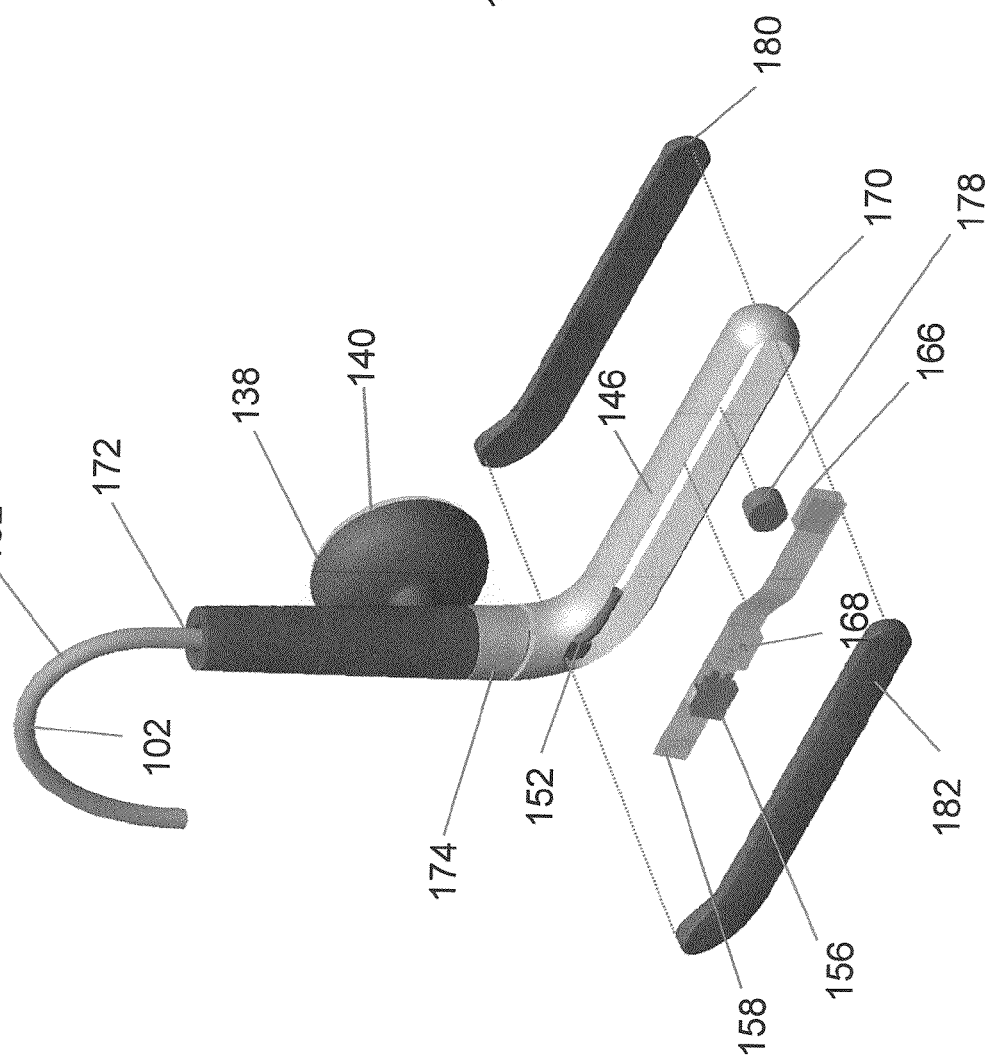

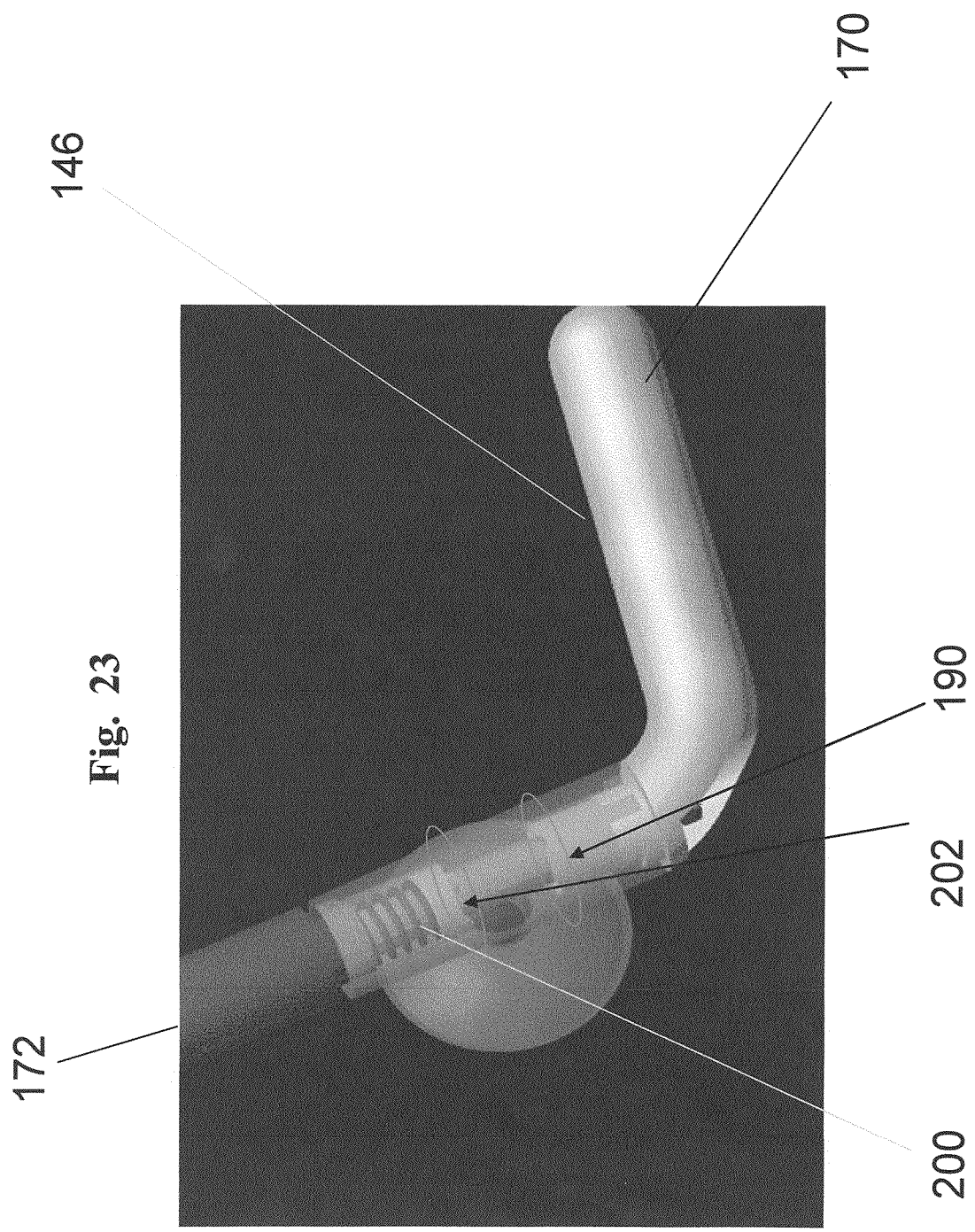

HEADSET WITH A PIVOTING MICROPHONE ARM AND SPEAKER

BACKGROUND OF THE INVENTION

1. Field of the Disclosure

The disclosure relates in general to communication devices and, more particularly, to a headset for use with a mobile phone or other electronic communication device.

2. Background Art

Some headsets incorporate a boom or arm that contains the microphone which positions it closer to the user's mouth. Existing headsets with the microphone arm typically have a better microphone audio response and a higher perceived quality verses headsets without booms or arms.

However existing conventional microphone arms are not always user adjustable and nor have the ability to fold into the device to provide a compact size. Consequently, these headsets are not considered very portable.

It is, therefore, desirable to provide an improved communication device, which overcomes most, if not all of the preceding disadvantages.

SUMMARY OF THE INVENTION

An improved communication device is provided comprising a headset or earset which is easy to use, lightweight, attractive and fun. The user friendly communication device is economical, efficient and effective. The portable communication device is also compact, sturdy and dependable.

In one preferred form, the wireless communication device comprises a wireless assembly comprising a wireless headset, wireless earset or wireless earpiece for wireless communication with an electronic communication device. The wireless assembly can have an antenna and battery, preferably a rechargeable battery.

The electronic communication device can comprise a wireless electronic communication device, such as one or more of the following: a mobile phone, flip phone, portable networking device, internet communications device, camera phone, clamshell device, radio telephone, cellular phone, personal digital assistant (PDA), wireless e-mail device, or handheld electronic device The communication device can have a pivotable boom that pivots clockwise and/or counterclockwise about an axis from a closed compact position to an open use position and at least one tactile button. The boom can contain at least one microphone and can also have at least one tactile button.

The wireless assembly can comprise a pivotable audio transducer such as a speaker, earbud or earphone on a pivotable stem for accommodating the left ear or right ear of the user. In one embodiment, the stem pivots about the same axis as the boom. The stem can be independently and separately manually pivotable from the stem. In another embodiment, the pivotable audible transducer can be coupled to the boom, such as through the stem, so that the boom automatically pulls and pivots the pivotable audible transducer. This embodiment can comprise an angularly telescoping boom and speaker stem combination.

The communication device can comprise at least one tactile spring-loaded cam for clicking and/or indicating to the user the position of the boom and/or stem. Furthermore, the boom and/or assembly can comprise at least one magnet for holding the boom in the closed compact position. A magnet in the boom can activate an electrical switch, such as a hall effect switch or reed switch, when the boom is pivoted to detect pivoting and position of the boom.

There are different methods of routing the electrical wires between the pivoting boom and main housing so as to connect the inner electronics of the pivoting boom back to the main circuit board in the assembly. The wires can be routed through the axis of a tubular connector, such as pivot pin comprising a hollow screw or hollow rivet, which share the same axis of rotation of the boom, or can be parallel to and offset from the axis so that the wires are routed outside of the pivoting axis or mechanical attachment of the boom and/or stem.

The communication device can be a wired communication device which is hard wired or detachably wired or plugged into the electronic device. The wired electronic device does not need an antenna or battery.

The novel headset can have a unique articulating microphone arm (boom) and speaker tower. The articulation in the microphone arm and speaker tower is user adjustable so the device can be optimized to fit the face for left or right hand users.

The microphone arm (boom) can be extended toward the mouth and folded into a closed position. The closed position provides an integrated solution with the main body and maximizes portability like no other headset with a microphone arm.

The communication device can have two microphones in the arm (boom) for noise cancelation. The communication device can have a speaker located to the main body. The speaker can be mounted in a separate housing that pivots relative to the microphone arm and main body.

Furthermore, the communication device can have two microphones with two separate ports in a pivoting arm (boom).

The communication device can have a microphone arm (boom) attached to a main body and a transducer located in a separate housing that pivots relative to the main body.

The communication device can have an independently rotating boom and ear stem that share the same axis of rotation. Ear stem rotation provides additional comfort. Each boom or ear stem rotation motion can have its own independent detents or clicks.

Magnets can be located in both the main body and boom and used to help secure the boom in the closed position. Magnets can improve the overall experience.

The communication device can have multiple microphones mounted in the boom.

The rotating boom and ear stem can be provided in which boom can rotate either clockwise (CW) or counterclockwise (CCW) and the ear stem follows that boom.

The communication device can have a unique articulating microphone arm (boom) and speaker tower. The microphone arm can be extended toward the mouth and folded into a closed position. The closed position provides an integrated solution with the main body and maximizes portability. Also, an alternate embodiment has been included that automatically rotates the speaker in the proper position when the microphone boom is opened.

A more detailed explanation of the invention is provided in the following detailed descriptions and appended claims taken in conjunction with the accompanying drawings.

BRIEF DESCRIPTION OF THE DRAWINGS

FIG. 4 is a perspective view of a wireless communication device comprising a wireless headset or wireless earset in a closed compact position in accordance with principle of the present invention.

FIG. 5 is a perspective view of the wireless communication device comprising a wireless headset or wireless earset in an open use position in accordance with principle of the present invention.

FIG. 8 is a diagrammatic assembly view of a wireless communication device comprising the wireless headset or wireless earset in the open use position in accordance with principle of the present invention.

FIG. 9 is a diagrammatic assembly view of the wireless communication device comprising the wireless headset or wireless earset in the closed compact position.

FIG. 13 is a reduced diagrammatic view of another wireless communication device comprising a wireless headset or wireless earset in accordance with principle of the present invention.

FIG. 14 is an enlarged diagrammatic cross-sectional view of the wireless communication device comprising a wireless headset or wireless earset in accordance with principle of the present invention.

FIG. 19 is another diagrammatic perspective assembly view of a boom assembly in a wireless communication device comprising a wireless headset or wireless earset in accordance with principle of the present invention.

FIG. 20 is a diagrammatic perspective view of the boom assembly.

FIG. 23 is a perspective view of cams in the speaker housing and boom housing.

DETAILED DESCRIPTION OF THE INVENTION

The following is a detailed description and explanation of the preferred embodiments of the invention and best modes for practicing the invention.

Figure 25:
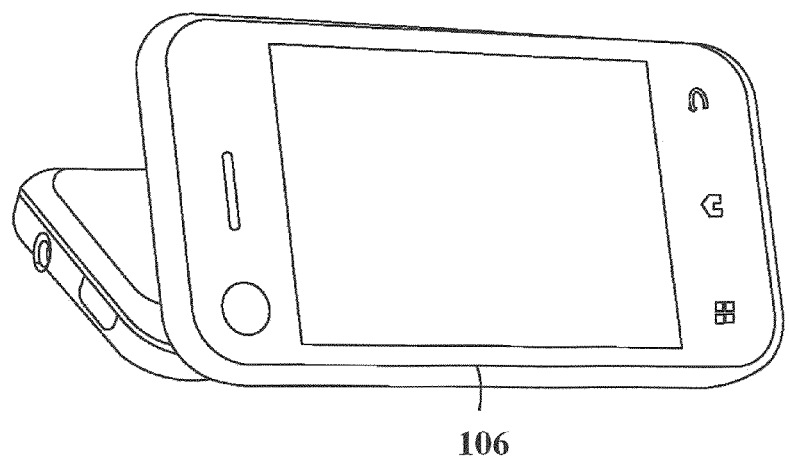
FIG. 25 is a perspective view of an electronic communications device.

As shown in the drawings, a wireless communication device 100 (FIGS. 1 and 2) comprises a wireless headset 102 or wireless earset 104 for wireless communication, such as by Bluetooth, with a wireless electronic communication device 106 (FIG. 25), such as one or more of the following: a mobile phone, flip phone, portable networking device, internet communications device, camera phone, clamshell device, radio telephone, cellular phone, personal digital assistant (PDA), wireless e-mail device, or handheld electronic device.

The wireless communication device can have a main housing 108 providing a main headset body (FIGS. 1 and 2) with switches 110 comprising tactile buttons 112 including a volume up (increase) control button 114, a volume down (decrease) control button 116, a mute button 118, and a slidable power activation button 120. The main housing can contain a main printed circuit board (PCB) 122, a rechargeable battery 124, a micro universal serial bus (μUSB) 126 and a magnet 128 (housing magnet). An antenna 130 can be connected and mounted to the top of the main housing for receiving signals from and transmitting signals to the electronic communication device.

The wireless communication device (FIGS. 1 and 2) can have a wire bundle 132 (speaker wire bundle) comprising two wires which are operatively connected to a pivotable acoustic audio transducer 134 in a speaker housing 135 comprising a loud speaker 136 and/or an earbud 138 or earphone 140. The audio transducer can pivot on a pivot tube 142 comprising a pivotable stem (transducer-stem) (speaker stem) (ear stem) about an axis 144 of rotation to accommodate the left ear or right ear of the user. The audio transducer can be coupled to a pivotable boom 146 (microphone boom) (rotatable boom) via a pivotable boom-stem 148 comprising a tubular connector, such as hollow boom pin, hollow screw or hollow rivet, a solid connector 150 comprising a boom plug and a boom wire bundle 152 comprising 5-6 wires. The speaker stem and boom can pivot about the same axis of rotation.

Figure 7:
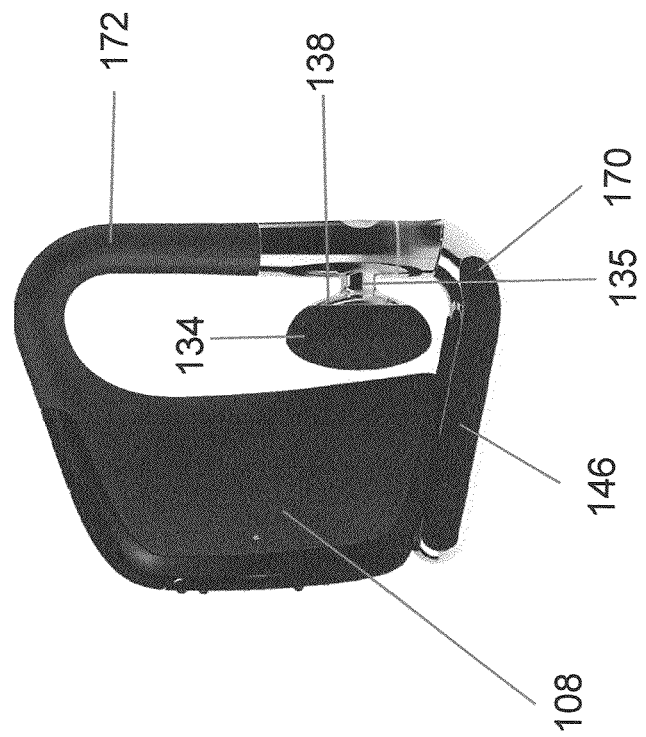
FIG. 7 is a perspective view of the wireless communication device comprising the wireless headset or wireless earset in the closed compact position.
Figure 6:
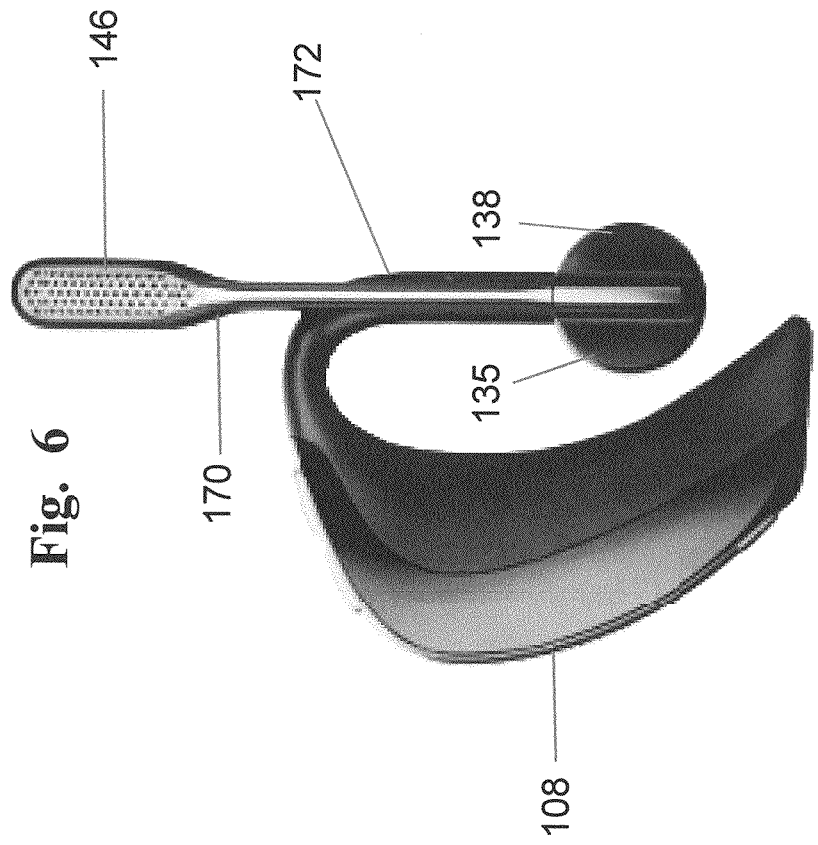
FIG. 6 is a top view of the wireless communication device comprising the wireless headset or wireless earset in the open use position.

The boom can comprise a microphone arm (swing arm) and pivot about an axis 154 of rotation (boom-axis) with the pivotable boom-stem from a closed compact position (FIGS. 4, 7 and 9) to an open use position (FIGS. 1-3, 5, 6 and 8) in acoustical proximity to a user's mouth for receiving sounds and speech from the mouth of the user. The boom can have one or more tactile buttons 156 (FIG. 1) such as comprising a multifunction tactile button (MFB) switch, hang-up button, off button, answer button, hold button, or combinations thereof. The boom can contain boom flex 158 comprising flexible conductive metal. The boom can also contain a magnet 160 (boom-magnet) (FIGS. 2, 8 and 9) which cooperates with the housing magnet for holding the boom in the closed compact position, so that the boom is securely held against the main body housing when the boom is in the 0 degree position. The boom-magnet can also trigger an electrical switch such as a hall effect switch or reed switch to detect the pivoting action of the boom. This feature can be used to put the headset into a different software mode, such as activate or inactive the headset.

The boom (FIGS. 1 and 2) can have two ports 162 and 164 that comprises holes or openings which receive and hold two microphones 166 and 168, respectively. The ports and microphones can comprise inner and outer ports and inner and outer microphones. The microphones are spaced apart, separated and cooperate with each other to provide noise cancellation. The microphones can comprise microelectricalmechanical systems (MEMS) microphones or surface mounts technology (SMT) microphones.

Figure 3:
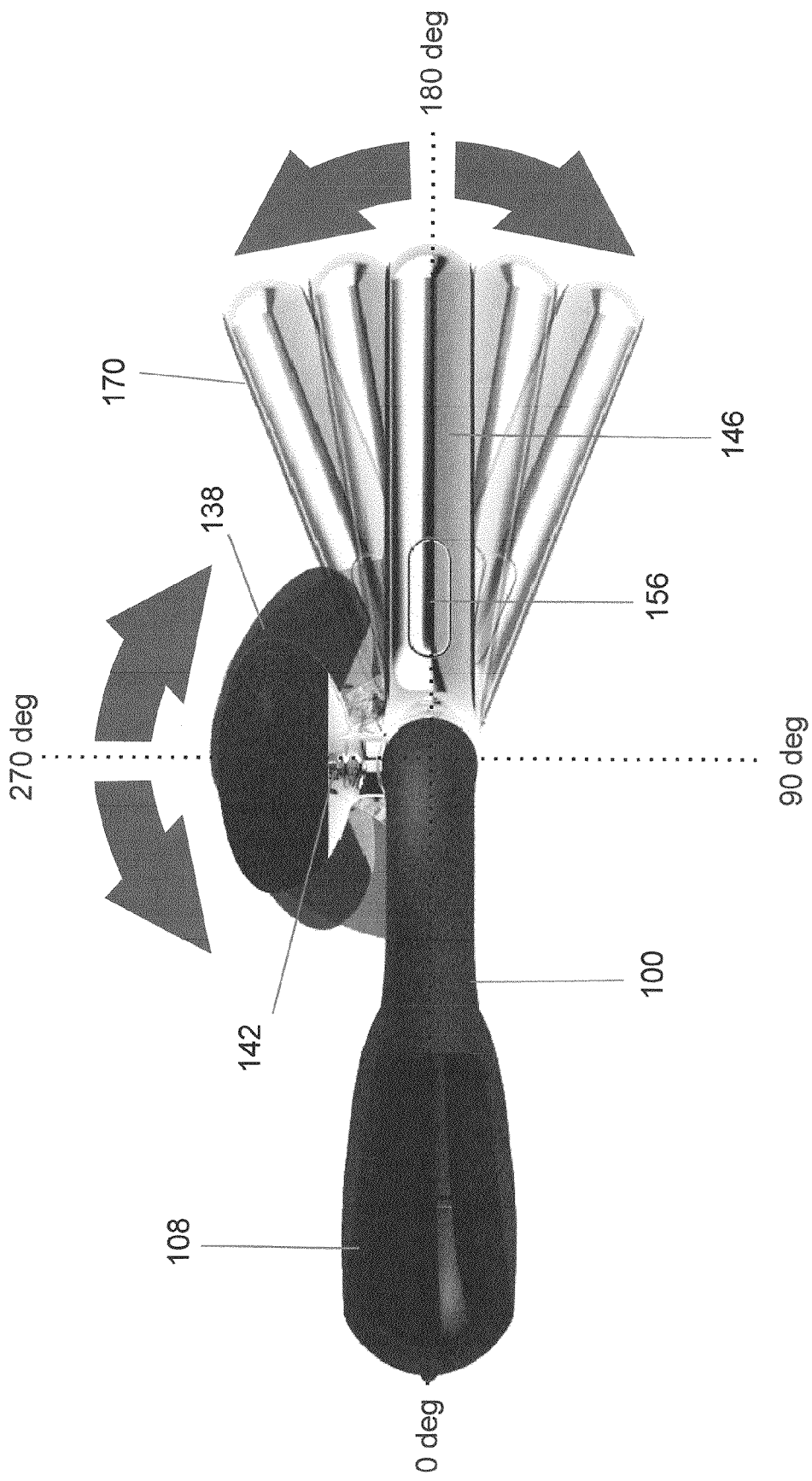
FIG. 3 is a top diagrammatic view of a wireless communication device comprising an adjustable wireless headset or wireless earset in accordance with principle of the present invention.

FIG. 3 illustrates the adjustable wireless headset or wireless earset in which the boom and audio transducer can pivot clockwise and/or counterclockwise. Preferably, the maximum pivot or rotation is 360 degrees so that the wires do not break.

Most preferably, the boom pivots 180 degrees and the transducer audible and transducer-stem (speaker-stem) pivot 100 degrees. The boom can rotate (pivot) 180 degrees clockwise or 180 degrees counterclockwise.

The wireless communications device can have a boom housing 170 (FIGS. 4-7) and a speaker tower 172 that provides an overmold housing for the speaker wire bundle, boom wire bundle and some of the components associated with audio transducer. The wireless communication device is moveable and pivotable from a closed compact position (FIGS. 4 and 7) to an open use position (FIGS. 5 and 6) and vice versa.

Figure 10:
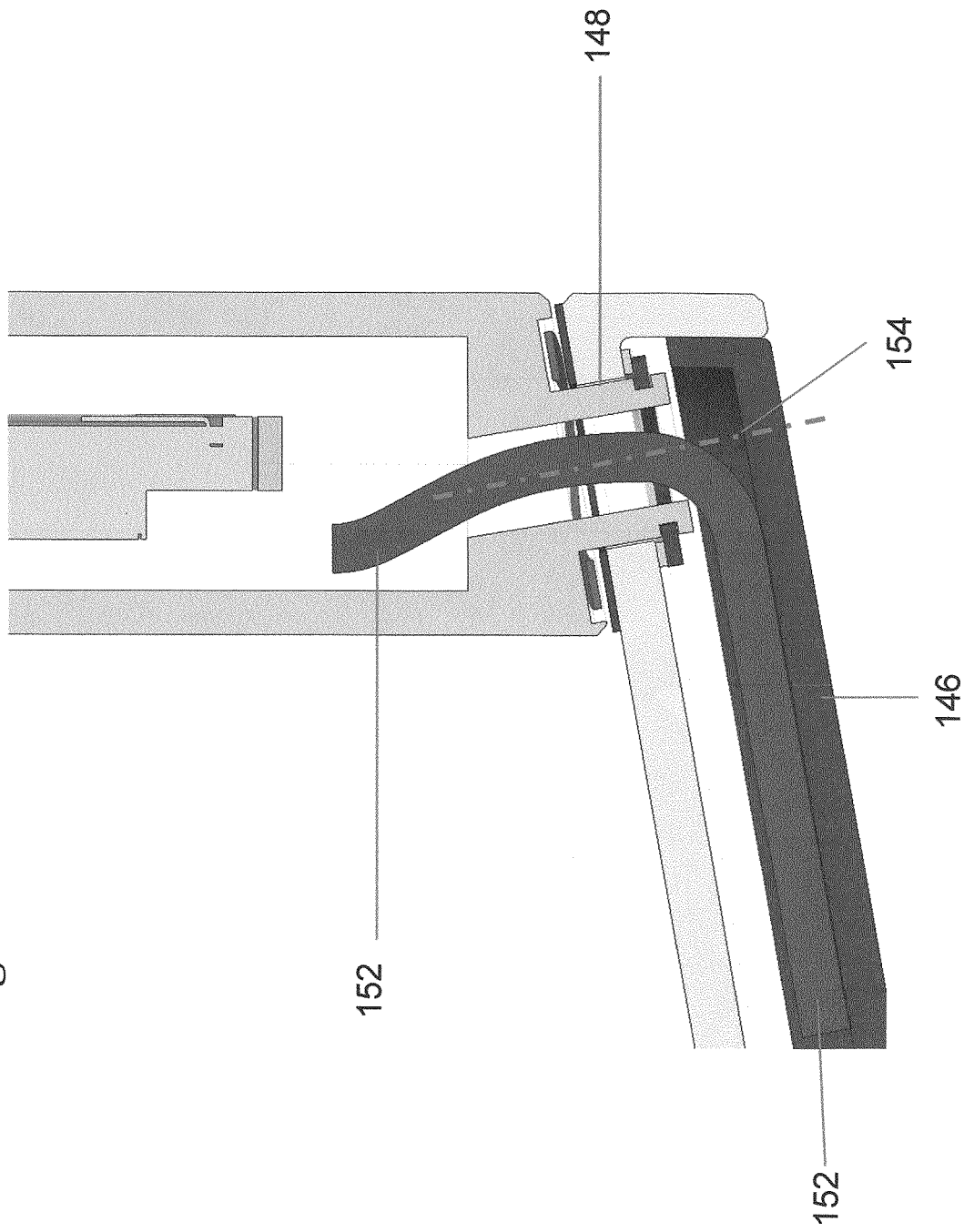
FIG. 10 is a diagrammatic cross-sectional view of wire routing in a wireless communication device comprising the wireless headset or wireless earset in accordance with principle of the present invention.
Figure 12:
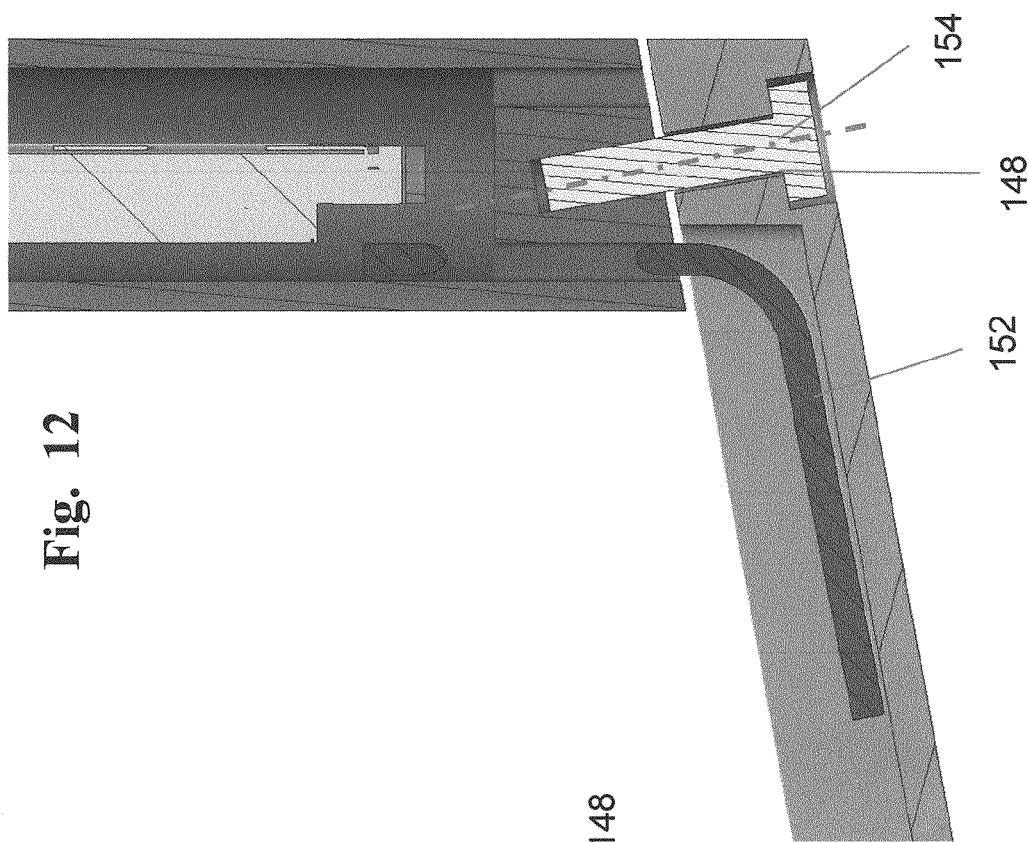
FIG. 12 is a diagrammatic cross-sectional view of further wire routing in a wireless communication device comprising the wireless headset or wireless earset in accordance with principle of the present invention.
Figure 11:
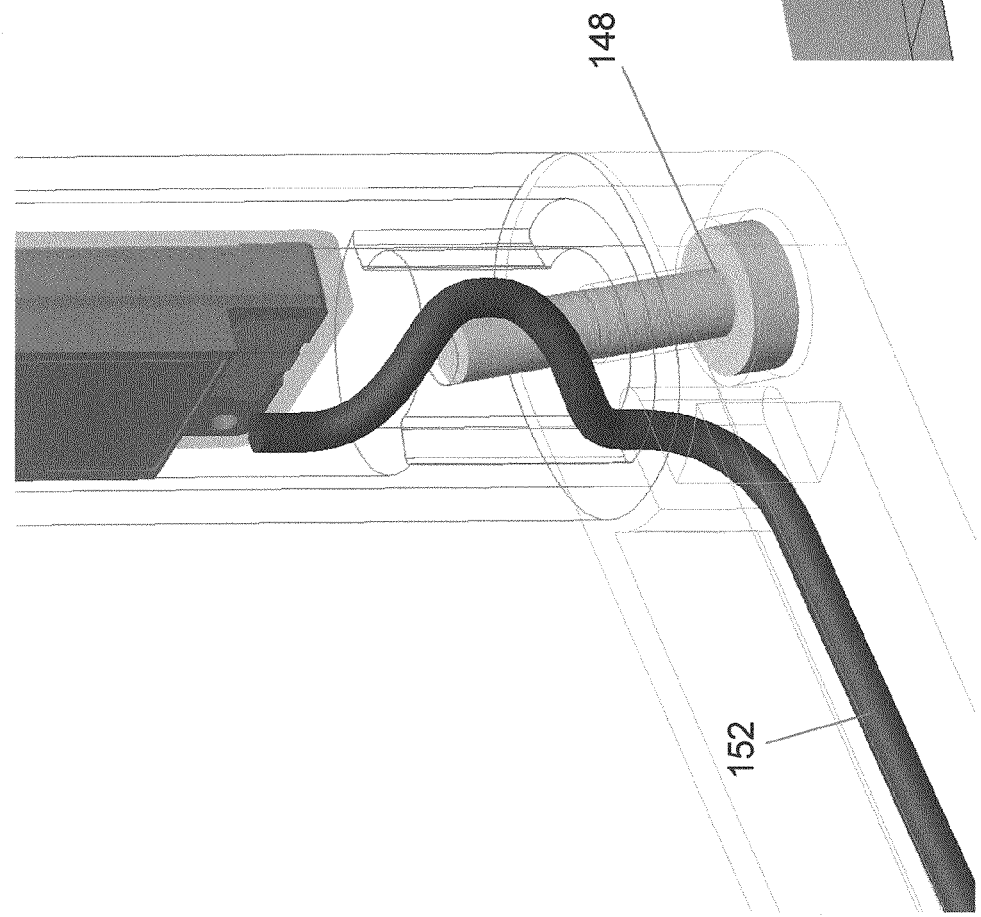
FIG. 11 is a diagrammatic perspective view of another wire routing in a wireless communication device comprising the wireless headset or wireless earset with portion cutaway for ease of understanding and clarity in accordance with principle of the present invention.
Figure 16:
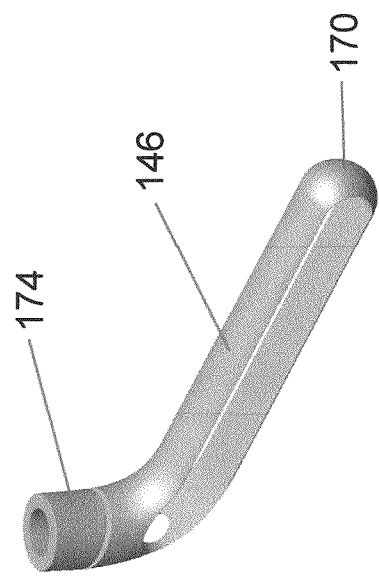
FIG. 16 is a diagrammatic perspective view of the boom housing assembly.

There are different methods of routing the electrical wires between the pivoting boom and main housing so as to connect the inner electronics of the pivoting boom back to the main circuit board mounted in the headset body. The wires can be routed through the axis of the pivot pin comprising a hollow screw or hollow rivet, which share the same axis of rotation of the boom, as shown in FIG. 10 or parallel to and offset from the axis so that the wires are routed outside of the pivoting axis or mechanical attachment of the boom and/or ear stem (speaker stem) as shown in FIGS. 11 and 12.

Figure 15:
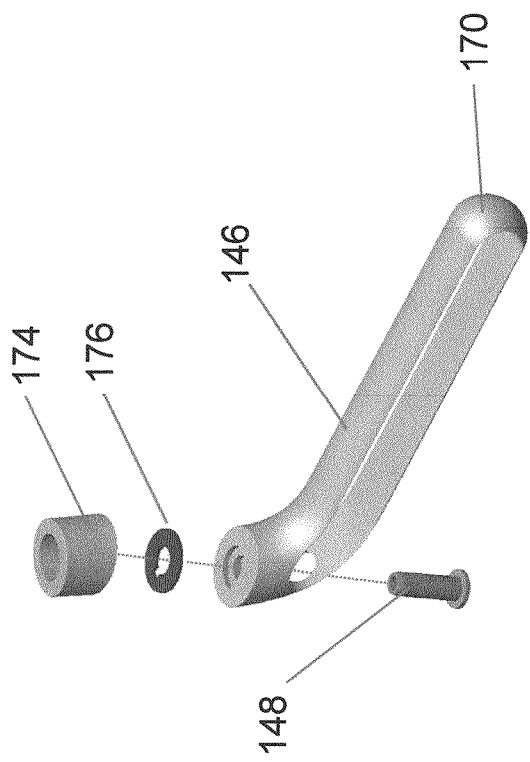
FIG. 15 is a diagrammatic perspective assembly view of a boom housing assembly in a wireless communication device comprising a wireless headset or wireless earset in accordance with principle of the present invention.
Figure 18:
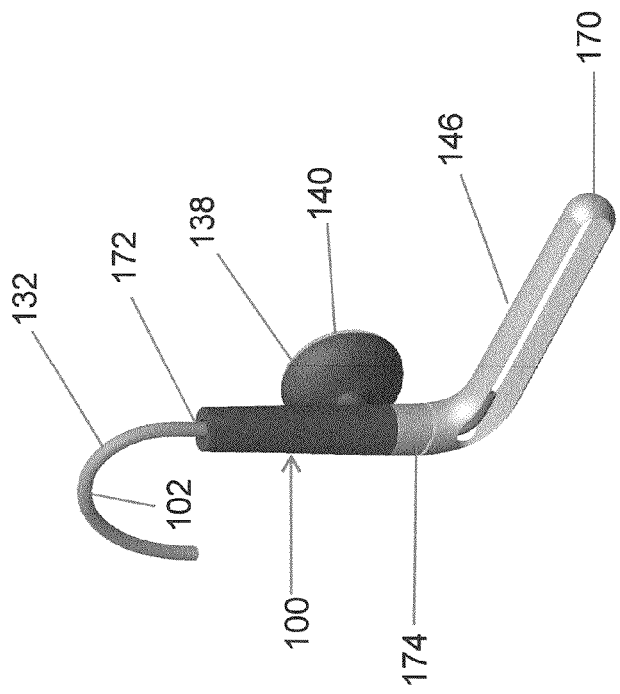
FIG. 18 is a diagrammatic perspective view of the boom assembly.

The tower and boom housing can have a pivot housing 174 (swivel housing) (FIGS. 14 and 15) and a washer 176. In the boom housing assembly 170 of FIG. 15, the hollow pin 148 can be pressed fitted or crimped into the swivel housing 174 to retain the boom 146 to the swivel housing.

Figure 17:
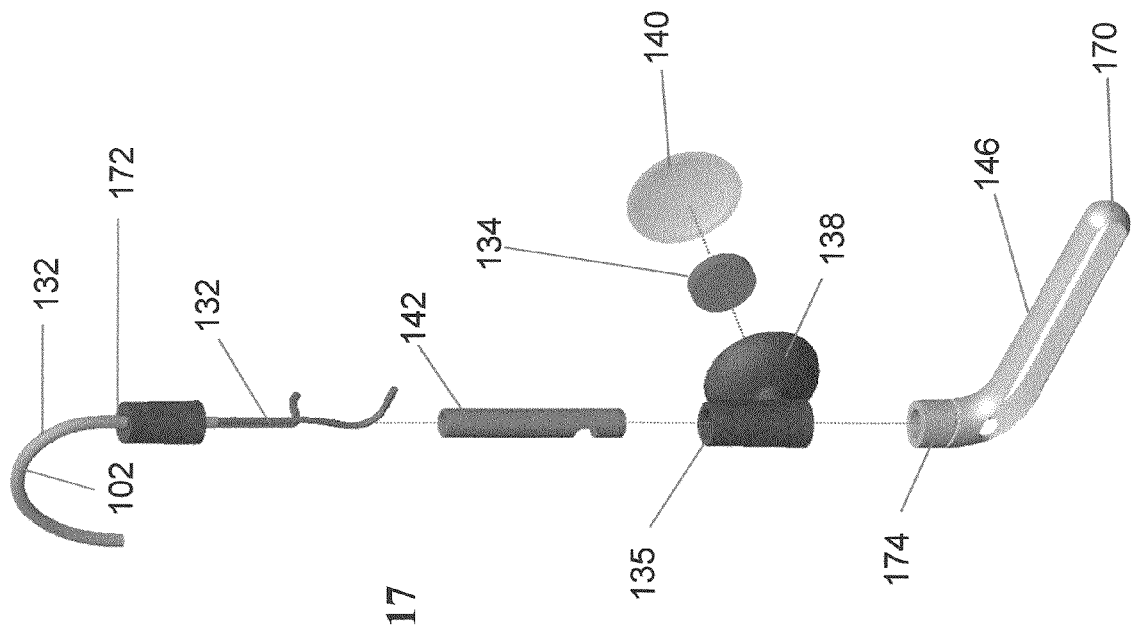
FIG. 17 is a diagrammatic perspective assembly view of a boom assembly in a wireless communication device comprising a wireless headset or wireless earset in accordance with principle of the present invention.

In the boom assembly of FIG. 17, the wire bundle 132 is routed to the pivot tube and into the boom housing 170. The overmold 172 is inserted over the pivot tuber 135 and attached, such as via glue or adhesive. The pivot tube is inserted through the speaker housing 135. The rubber overmold can ride on one edge of the speaker house to reduce rotation and provide an abutment stop. The pivot tube can be inserted into the boom assembly and attached via glue, adhesive or a set screw.

In the boom assembly of FIG. 19, after the boom flex 158 and printed circuit board (PCB) are assembled into the boom 146, the boom wire bundle 152 is soldered to provide contacts. Grommets 178 can be placed between the microphones 166 and 168 and covers 180 and 182 to insure an acoustic seal. Acoustical mesh and/or foam can reside between the grommets and covers to provide acoustical insulation. The inner cover 180 can be heat staked to one side of the boom 146. The outer cover can be snapped or glued to sloe up the boom assembly.

Figure 21:
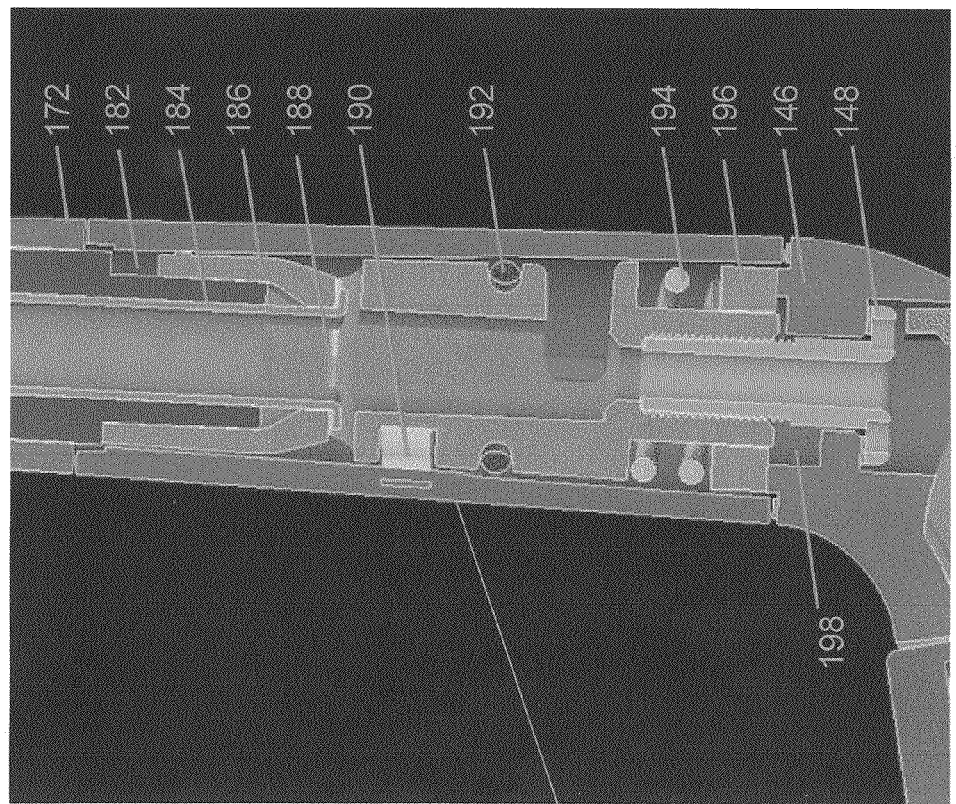
FIG. 21 is an enlarged diagrammatic cross-sectional view of the wireless communication device comprising a wireless headset or wireless earset in accordance with principle of the present invention.

In the boom assembly of FIG. 21, there is shown the rubber overmold housing 172 and ear loop portions of the main housing. An upper abutment stop 182 comprising an ear stem rotational hard stop can only allows ear stem rotation between −100 degrees and +100 degrees. A metal hook 184 can be inserted and molded into the overmold housing 172. The boom assembly can have plastic locking snaps 186 on an inner frame part 188. A metal leaf spring 190 can provide a three ear stem that clicks. A rubber O-ring 192 can adjust the rotational friction of the ear stem. A boom coil spring 194 can be biased against a boom cam 196 to help provide the click feel of the boom. A boom hard stop 198 provides a lower boom abutment barrier and stop can allow 0 to 180 degrees pivotal movement of the boom.

Figure 22:
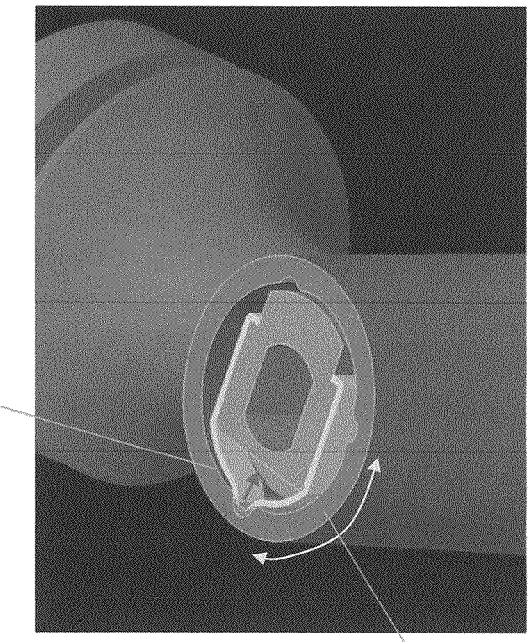
FIG. 22 is an enlarged perspective view of metal leaf spring flexes in the boom assembly.

The metal leaf spring 190 of the boom assembly of FIG. 22 flexes in the radial arrow direction as the ear stem or pivot housing 174 rotates in the circular arrow direction and clicks at −100 degrees, 0 degrees and +100 degrees positions.

The boom assembly of FIG. 23 can have boom cams 190 and a tower coil spring 200 biased against tower cams 202 (speaker housing cams) to provide the click feel of the boom and tower. Four cams can be provided in the tower and four cams can be provided in the boom housing for a total of 8 cams. The cams can have three different height to control the order at which the engage and disengage the boom as the boom pivots.

The pivoting speaker stem and microphone boom can incorporate tactile click feedback to the user when rotated to certain orientations. The internal spring-loaded cam of the boom helps the user feels clicks at the 0 degree closed position and again at the 180 degree open position. Similarly, the pivoting speaker stem has a tactile spring-loaded cam or leaf spring that helps the user feels a clock at the 0 degree position, +100 degree position and −100 degree positions. These angular positions for feeling the clicks can be adjusted to other angles, if desired.

The speaker stem can be pivoted or rotated by the user if desired or if the internal speaker stem cam is omitted. The speaker stem can automatically open or close based upon the pivot position or rotation of the boom in response to the internal speaker cam and boom cam.

The speaker stem can be manually rotated or pivoted to a fully open position or back to a fully closed position. For right ear use, the user can pivot the boom by hand clockwise as viewed from above from a 0 degree position to 180 degree position. As the boom progresses through its 0 to 180 degree pivot (rotation), the boom automatically grabs the speaker stem and opens it up to the desired speaker stem angle, such as 100 degrees or 90 degrees. Similarly, as the boom is pivoted or rotated back to the 0 degree closed position, the boom automatically grabs the speaker stem and rotates it back to the 0 degree closed position as sell, so that when the boom reaches the 0 degree closed position, the speaker stem is also in a 0 degree closed position.

For left ear use, the same speaker stem and boom pivoting movement and rotation occur as described above, except that the boom and ear stem pivot in a counter clockwise direction together as viewed from above.

If it is desirable to have internal cam to feel click in embodiment 2, the speaker stem may only open to +90 degrees to −90 degrees because the internal rotating cam have to be symmetrical and have ear lobes 180 degrees apart. However, if the internal cam is omitted in embodiment 2, then the speaker stem can open to angles other than 90 degrees such as +100 degrees to −100 degrees. The above arrangement can provide an angularly telescoping boom and speaker stem combination.

Figure 24:
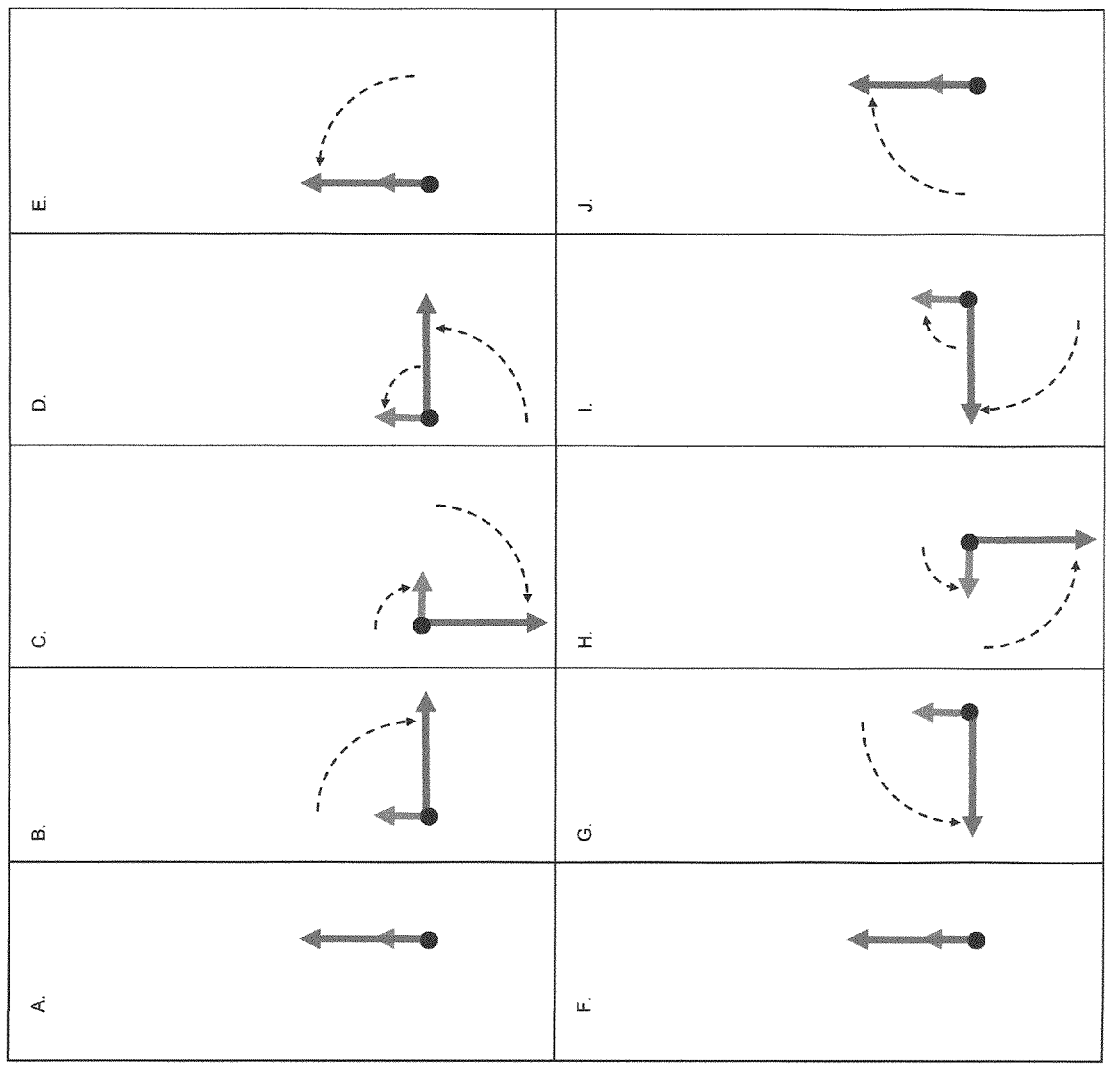
FIG. 24 is a chart of various positions of the boom and speaker tower.

The arrows of the chart in FIG. 24 illustrate the positions of the boom as speaker tower as viewed from the top. In part A of the chart, the boom and speaker tower start at the 0 degree closed position. In part B of the chart, the boom rotates (pivots) +90 degrees first and a smaller click is felt at the 90 degree position, but the speaker tower has not yet moved. In part C of the chart, the boom continues to pivot from a +90 degree position to a +180 degree position during which the speaker tower is locked with the boom and follows to the +90 degree position where the speaker tower meets with a hard stop. When the boom rotates (pivots) to the +180 degree position, it meets another hard stop and a smaller click occurs at this position. In part D of the chart, as the boom is rotated (pivoted) back to the +90 degree position, the speaker tower pivots back to the 0 degree position and a larger click is felt at this position. In part E of the chart, as the boom is pivoted back to the 0 degree position, the speaker tower remains at the 0 degree position and a smaller click is felt at this position.

In part F of the chart of FIG. 24, the boom and speaker tower start the 0 degree position. In part G of the chart, the boom pivots to a −90 degree position first and a smaller click is felt at this position, but the speaker tower has not yet moved in this position. In part H of the chart, the boom continues to pivot from a −90 degree position to a −180 degree position during which the speaker tower is locked with the boom and follows to the −90 degree position where the speaker tower meets with a hard stop. When the boom rotates (pivots) to the −180 degree position, the boom meets another hard stop and a smaller click occurs at this position. In part I of the chart, as the boom is rotated (pivoted) back to the −90 degree position, the speaker tower pivots back to the 0 degree position and a larger click is felt at this position. In part J of the chart, as the boom is pivoted back to the 0 degree position, the speaker tower remains at the 0 degree position and a smaller click is felt at this position.

Figure 2:
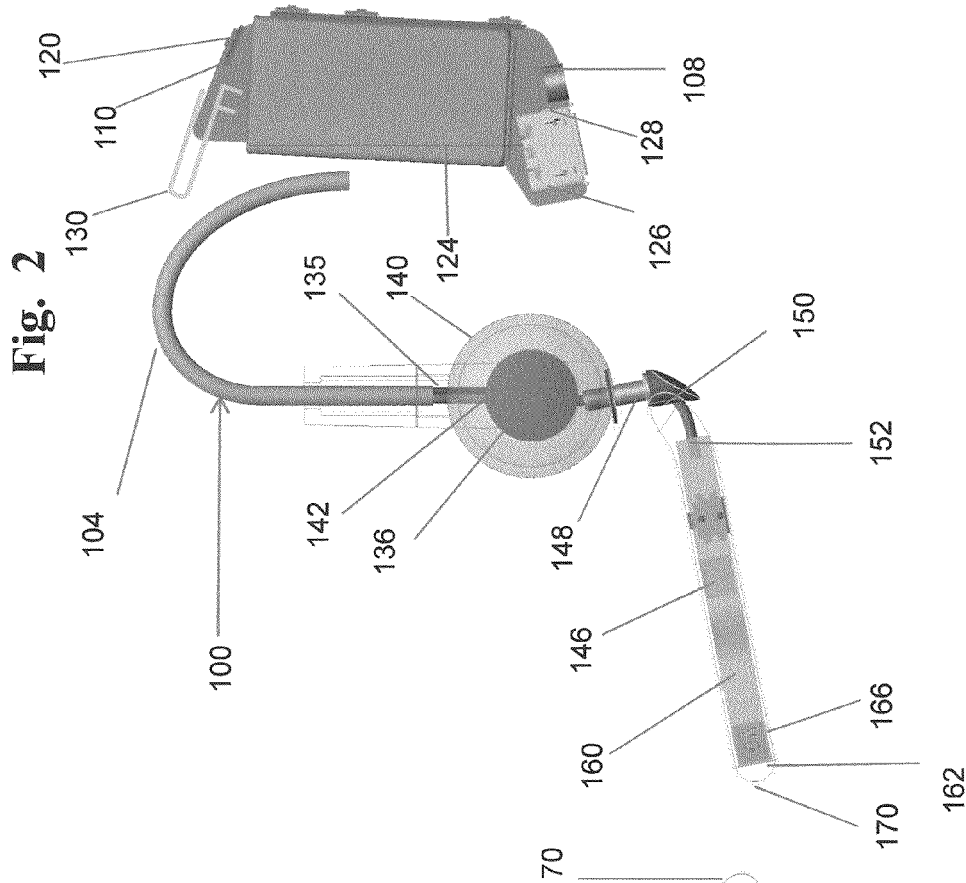
FIG. 2 is a front diagrammatic view of the wireless communication device comprising a wireless headset or wireless earset.
Figure 1:
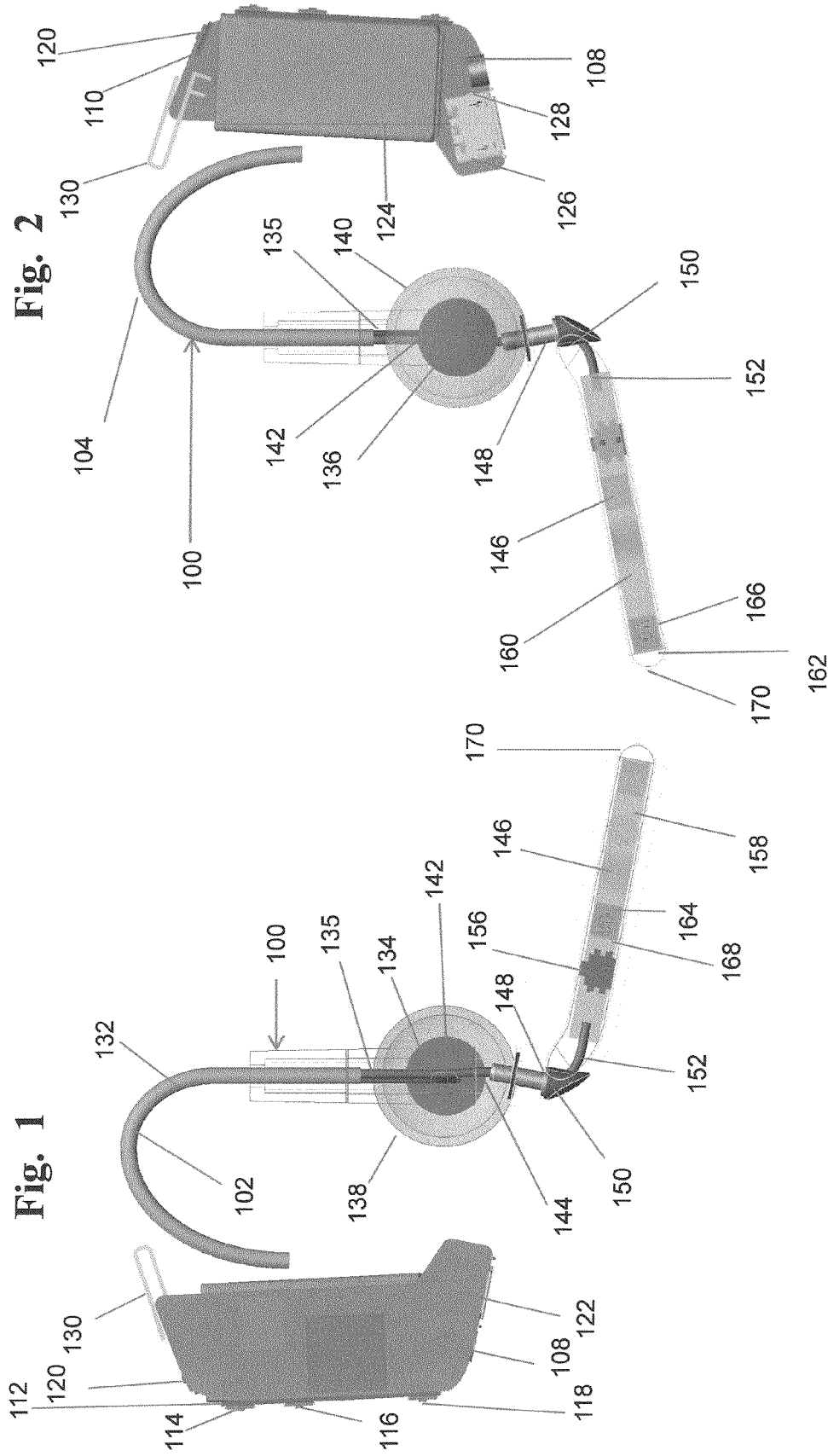
FIG. 1 is a back diagrammatic view of a wireless communication device comprising a wireless headset or wireless earset in accordance with principle of the present invention.

The headset of the communication device has a unique articulating microphone arm (boom) and a speaker tower. The arm can contain two microphones positioned at the end of the arm (FIGS. 1 and 2). A speaker can be mounted within a speaker housing and allowed to pivot parallel and relative to the arm motion. The main electrical components including a printed circuit board (PCB), rechargeable battery, antenna, etc. can be mounted in a main housing. The arm can pivot relative to the speaker housing the main housing. The main housing can be located but is not limited to behind the ear.

The microphone arm (boom) can pivot from a fully closed position (0 deg) to an open position (~220 deg) (FIG. 3). The speaker housing (tower) can pivot from the one side of the main housing to the other to allow for both left and right hand users. When the microphone arm is in its fully closed position (0 deg), it can be integrated with the main housing and provides a compact form for portability (FIGS. 4 and 5) and provides an overall size advantage (FIGS. 6 and 7) compared to prior conventional headsets.

Magnets can be used to assist in closing the arm (boom) from its open position (FIG. 8) to its fully closed position (FIG. 9). A hall effect switch can be added to sense the position of boom using the magnet and place the device into a second mode.

There are two possible methods of routing the electrical wires between the pivoting boom and main housing. The wire(s) can be routed through the axis of the pivot point (FIG. 10) or parallel to the axis (FIGS. 5, 11 and 12).

The arm (boom) can also contain one or more switches to provide control functions.

The boom and speaker stem both can pivot back to the closed position and this feature along with the magnets can allow for compact storage in a user's pocket or purse. Conventional behind the ear headsets are bigger and bulkier with respect to the boom and speaker components.

Starting from a 0 degree closed position, the boom can open and pivot either clockwise or counterclockwise, so there is minimal risk the user damaging or breaking the boom by rotating the boom in the wrong direction when starting from the rest or closed position.

Although the user can rotate the speaker stem by itself, the speaker stem is also automatically rotated in the appropriate position by automatically following the movement of the boom. It is not necessary for the user to touch the speaker stem in order for the speaker stem to pivot in response to rotation, movement or pivoting of the boom. The manual rotation of the boom automatically rotates the speaker orientation to left hand use or right hand use or to a closed storage position.

The pivoting speaker allows for left and right hand use on both sides of the head.

Embodiment 2 can provide a semi-automatic speaker location feature.

In some circumstances, it may be desirable, such as with multiple-mic digital signal processor (DSP) software algorithms to mount the microphones(s) in the main body instead of the boom to achieve the desired performance.

FIGS. 21-22 illustrate a preferred low-cost design. FIGS. 23-24 illustrates an alternate embodiment of a lower-cost approach to allow a boom to rotate 180 degrees in either direction.

In the drawings, FIGS. 1, 2, and FIGS. 8-20 show an embodiment where the ear stem axis of rotation is not the same as the boom axis of rotation, while FIGS. 21-22 show the preferred embodiment of the headset where the ear stem axis of rotation is the same as the boom axis of rotation. The stem and boom axis of rotation are also the same for the alternate embodiment shown in FIGS. 23-24.

Among the many advantages of the communication device are:
1. Superior capability.
2. Superb performance
3. Operable in both a manual and semi-automatic mode.
4. Compact.
5. Attractive
6. Reliable.
7. Comfortable.
8. Portable.
9. User friendly.
10. Easy to use.
11. Durable
12. Economical.
13. Attractive.
14. Efficient.
15. Effective.

Although embodiments of the invention have been shown and described, it is to be understood that various modifications, substitutions, and rearrangements of parts, components, and/or process (method) steps, as well as other uses of the mobile electronic device can be made by those skilled in the art without departing from the novel spirit and scope of this invention.

What is claimed is:
1. A wireless communication device, comprising:
 a wireless assembly for wireless communications with an electronic communication device;

said wireless assembly selected from the group consisting of a wireless headset, a wireless earset, and a wireless earpiece;
said wireless assembly comprising
a main housing providing a main headset body;
a pivotable boom for pivoting about an axis from a closed compact position to an open use position;
magnetically engageable magnets comprising a first magnet and a second magnet for interlockingly engaging and securely fastening said main body to said pivotable boom when said pivotable boom is in said closed compact position;
said first magnet comprising a housing-magnet operatively associated with said main housing;
said second magnet comprising a boom-magnet operatively associated with said pivotable boom; and
said electronic communication device selected from the group consisting of a mobile phone, flip phone, portable networking device, internet communication device, camera phone, clamshell phone, radio telephone, cellular phone, smart phone, personal digital assistant (PDA), handheld electronic device, and combinations of any of the preceding.

2. A wireless communication device in accordance with claim 1 wherein said wireless assembly contains at least one microphone.

3. A wireless communication device in accordance with claim 1 wherein:
said wireless assembly comprises at least one tactile button and at least one tactile spring loaded cam for clicking and for audibly indicating to the user the position of said pivotable boom; and
said boom comprises at least one tactile button.

4. A wireless communication device in accordance with claim 1 wherein said wireless assembly comprises a pivotable audio transducer including a speaker on a pivotable stem for accommodating the left ear or right ear of the user; said speaker stem being spaced from said pivotable boom; and said speaker being pivotable on said pivotable stem rather than on said boom.

5. A wireless communication device in accordance with claim 1 wherein said wireless assembly comprises:
an audio transducer comprising a speaker on a pivotable stem;
said stem being pivotable about the same axis as said boom; and
said boom being independently and separately pivotable from said pivotable stem.

6. A wireless communication device in accordance with claim 1 wherein said wireless assembly comprises:
a body;
a circuit board;
a bundle of wires for connecting said body to said circuit board;
a tubular connector about the same axis of said boom for receiving said bundle; and
said tubular connector selected from the group consisting of a hollow screw or hollow rivet.

7. A wireless communication device in accordance with claim 4 wherein:
said pivotable boom can rotate clockwise or counterclockwise; and
said pivotable audio transducer includes an earbud or earphone.

8. A wireless communication device in accordance with claim 1 wherein said wireless assembly comprises:
a pivotable audio transducer coupled to said boom;
said boom comprising a boom housing assembly with a spring-loaded cam;
said boom pulls and pivots said pivotable audible transducer comprising a speaker;
said audible transducer pivots on a pivotable stem;
said boom and pivotable stem cooperating with said spring-loaded cam for providing a tactile and click feedback; and
said boom comprises an angularly telescoping boom cooperating with said stem.

9. A wireless communication device in accordance with claim 1 wherein said wireless assembly comprises:
an electrical switch selected from the group consisting of a hall effect switch and reed switch;
said electrical switch being spaced and separate from said housing-magnet and said boom-magnet;
said boom-magnet cooperating with said electrical switch for triggering and activating said electrical switch when said boom is pivoting to detect pivoting and position of said boom; and
said wireless assembly is operable in different software modes.

10. A wireless communication device in accordance with claim 1 wherein said wireless assembly comprises:
a body;
a circuit board;
wires for connecting said body to said circuit board; and
said wires are routed outside of and spaced from the axis of said pivotable boom.

11. A communication device, comprising:
an assembly for communications with an electronic communication device;
said assembly selected from the group consisting of a headset, a earset, and a earpiece;
said assembly comprising
a main housing providing a main headset body;
a pivotable boom for pivoting about an axis from a closed compact position to an open use position;
a pair of magnetically engageable magnets comprising a first magnet and a second magnet for interlockingly engaging and securely fastening said main body to said pivotable boom when said pivotable boom is in said closed compact position;
said first magnet comprising a housing-magnet operatively associated with said main housing;
said second magnet comprising a boom-magnet operatively positioned in said pivotable boom;
said electronic communication device selected from the group consisting of a mobile phone, flip phone, portable networking device, internet communication device, camera phone, clamshell phone, radio telephone, cellular phone, smart phone, personal digital assistant (PDA), handheld electronic device, and combinations of any of the preceding; and
said assembly is selected from the group consisting of (a) a wireless assembly with an antenna for wireless communications with said electronic device, and (b) a wire assembly hard wired by detachable electric wires to said electronic device.

12. A communication device in accordance with claim 11 wherein said pivotable boom contains at least one microphone and at least one tactile button.

13. A communication device in accordance with claim 11 wherein:
  said wireless assembly comprises a pivotable audio transducer including a speaker on a pivotable stem for accommodating the left ear or right ear of the users; said speaker stem being spaced from said pivotable boom; and said speaker being pivotable on said pivotable stem rather than on said boom; and
  said stem is pivotable about the same axis as said boom.

14. A wireless communication device, comprising:
  a wireless assembly for wireless communications with an electronic communication device;
  said wireless assembly selected from the group consisting of a wireless headset, a wireless earset, and a wireless earpiece;
  said wireless assembly comprising a pivotable boom for pivoting about an axis from a closed compact position to an open use position;
  an electrical switch in said boom, said electrical switch being selected from the group consisting of a hall effect switch and reed switch;
  magnetically engageable magnets comprising a first magnet and a second magnet for interlocking engagement and securely fastening said main body to said pivotable boom when said pivotable boom is in said closed compact position;
    said second magnet comprising a boom-magnet contained in said pivotable boom; said boom-magnet cooperating with said electrical switch for triggering and activating said electrical switch when said pivotable boom is pivoting to detect pivoting and position of said pivotable boom;
  said pivotable boom comprising at least one microphone and said pivotable boom further comprising at least one tactile button selected from the group consisting of a hang up button, shutoff button and answering button;
  said electronic communication device selected from the groups consisting of a mobile phone, flip phone, portable networking device, internet communication device, camera phone, clamshell phone, radio telephone, cellular phone, smart phone, personal digital assistant (PDA), handheld electronic device, and combinations of any of the preceding;
  a main housing providing a main headset body with tactile buttons comprising a slidable power button, mute button, and a volume control button, and said main housing containing a rechargeable battery operatively connected to said buttons;
  said first magnet comprising a housing-magnet secured to said main housing;
  said second magnet being spaced from said first magnet when said pivotable boom in said open use position;
  said second magnet matingly engaging and contacting said first magnet when said pivotable boom in said closed compact position;
  said housing-magnet cooperating with said boom-magnet for securely holding said boom in the closed compact position;
  an antenna connected to said main housing for receiving signals from said electronic communication device; and
  a pivotable audio transducer including a speaker on a pivotable stem for accommodating the left ear or right ear of the user and said stem being pivotable about the same axis as said pivotable boom; said speaker stem being spaced from said pivotable boom; and said speaker being pivotable on said pivotable stem rather than on said pivotable boom.

15. A wireless communication device in accordance with claim 14 wherein said wireless assembly comprises:
  a body;
  a circuit board;
  a bundle of wires for connecting said body to said circuit board;
  a tubular connector positioned about the same axis of said boom for receiving said bundle;
    said tubular connector selected from the group consisting of a hollow screw and hollow rivet;
  said boom can rotate clockwise or counterclockwise; and
  said transducer includes an earbud or earphone.

16. A wireless communication device in accordance with claim 14 wherein:
  said at least one microphone in said pivotable boom includes two microphones comprising an inner microphone and an outer microphone, said pivotable boom defines two ports including an inner port and an outer port, said inner microphone being positioned about said inner port, and said outer microphone being positioned about said outer port; and
  said inner and outer microphones being spaced apart and cooperating with each other for providing noise cancellation.

17. A wireless communication device in accordance with claim 14 wherein said wireless assembly comprises:
  a pivotable tower for housing said stem and supporting said audio transducer; and
  said tower pivots relative to said housing and said boom.

* * * * *